(12) United States Patent
Jiang

(10) Patent No.: US 11,231,066 B2
(45) Date of Patent: Jan. 25, 2022

(54) BOOT WITH LUBRICANT RELIEF

(71) Applicant: Zhejiang Ruitai Suspension System Technology LTD, Ningbo (CN)

(72) Inventor: Haibin Jiang, Shangtian Town (CN)

(73) Assignee: Zhejiang Ruitai Suspension System Technology LTD, Ningbo (CN)

( * ) Notice: Subject to any disclaimer, the term of this patent is extended or adjusted under 35 U.S.C. 154(b) by 8 days.

(21) Appl. No.: 16/997,436

(22) Filed: Aug. 19, 2020

(65) Prior Publication Data
US 2021/0054873 A1    Feb. 25, 2021

Related U.S. Application Data

(60) Provisional application No. 62/889,683, filed on Aug. 21, 2019.

(51) Int. Cl.
*F16C 11/06* (2006.01)
*B60G 7/00* (2006.01)

(52) U.S. Cl.
CPC .......... *F16C 11/0623* (2013.01); *B60G 7/005* (2013.01); *F16C 11/068* (2013.01); *F16C 11/0666* (2013.01); *B60G 2204/416* (2013.01)

(58) Field of Classification Search
CPC . F16C 11/0671; F16C 11/0666; F16C 11/068; F16C 11/0619; F16C 11/0614; F16C 11/0623; F16C 11/0642; Y10T 403/31; Y10T 403/315; Y10T 403/32196; Y10T 403/32311; Y10T 403/32631
See application file for complete search history.

(56) References Cited

U.S. PATENT DOCUMENTS

| | | | | |
|---|---|---|---|---|
| 3,322,445 | A * | 5/1967 | Hassan | F16C 11/0671 403/51 |
| 4,121,844 | A | 10/1978 | Nemoto et al. | |
| 4,322,175 | A * | 3/1982 | Szczesny | F16B 21/20 277/635 |
| 5,466,084 | A * | 11/1995 | Brueggen | F16C 11/0671 403/134 |
| 6,102,604 | A | 8/2000 | Maughan | |
| 7,070,355 | B2 * | 7/2006 | Abels | F16C 11/0671 403/50 |
| 7,670,078 | B2 | 3/2010 | Elterman et al. | |
| 7,931,279 | B2 * | 4/2011 | Niwa | F16J 3/042 277/630 |
| 8,714,862 | B2 | 5/2014 | Mevorach et al. | |
| 9,790,983 | B2 * | 10/2017 | Kopsie | F16C 11/0671 |
| 2007/0048081 | A1 * | 3/2007 | Elterman | F16C 11/0671 403/122 |
| 2010/0194059 | A1 * | 8/2010 | Niwa | F16C 11/0671 277/630 |

* cited by examiner

*Primary Examiner* — Daniel J Wiley
(74) *Attorney, Agent, or Firm* — Grace J. Fishel

(57) ABSTRACT

A boot for a ball socket assembly in an automotive pivoting and/or rotating socket having a flange with one or more thinned sections or gates adjacent a point of attachment to a socket housing that provides an effective seal against contaminants when lubricant is not being added with external pressure and also flexes when exposed to internal pressure allowing contaminated lubricant to escape from the socket. A ring is embedded in the flange with inwardly directed teeth flanking the thinned sections or gates for securing the boot to the socket housing.

12 Claims, 5 Drawing Sheets

BOOT WITH LUBRICANT RELIEF

BACKGROUND OF THE INVENTION

Field of the Invention

The present invention relates to an elastomeric sealing member or boot with a lubricant release for use with a pivoting and/or rotating socket.

Brief Description of the Prior Art

In an automotive pivoting and/or rotating socket used for chassis applications, in many cases it is desirable to allow the end user to flush pressurized lubricant through the part to replace old lubricant that has been contaminated with wear products of the articulating socket and from intrusion of moisture and other contaminants. In such cases, it is often desirable to provide a relief or purge feature in an elastic sealing member, or boot which covers the space between the socket housing, and a protruding stud and which functions to seal the socket. The stud may pivot and/or rotate in the articulating socket contained within the housing, and connects the housing and socket to a cooperating part, fixedly attached to the shaft of the stud. The elastic sealing member must effectively isolate the internal components of the pivoting and/or rotating socket from outside contamination to keep moisture, salt, dirt and the like out. It is also desirable for the elastic sealing member to allow for contaminated lubricant within said socket and elastic sealing member to escape when internal pressure is applied, during addition of fresh lubricant to the socket assembly.

Lubricant release ports in the prior art are commonly located at the small end of the boot, however this can create problems with release of lubricant when the boot is installed. The small end of the boot can be pressed tightly against the mating part causing an undesirable extreme seal that cannot be overcome by the lubricant release passages and gates. As the pressure continues to increase, the seal likewise can continue to be pressed more tightly, creating a continued rise in internal pressure which can eventually cause the boot to burst, or become unseated from its mounting surfaces. In addition, there is often a flap of additional sealing material on this small end, to better protect (seal) from entry of contaminants at this small end of the boot. Over time, this sealing flap will wear due to relative sliding (rotating) motion between the mating parts. When the flap or seal deteriorates, the internal passages for lubricant flow, become more openly exposed, and contaminants can enter.

Another location disclosed in the prior art to add a lubricant release port is in the side wall of the boot. This release or relief location also creates problems, due to additional cost associated with locating a more complicated release sealing gate, to insure that the gate will not open in certain flex orientations of the boot. Even with additional attention to design, such a release port or gate can partially open when the boot flexes in some positions, allowing the possibility of contamination inside the boot cavity. Positioning the lubricant release port in the boot sidewall may also result in the same kind of over-sealing as release ports/gates located in the small end of the boot.

BRIEF SUMMARY OF THE INVENTION

It is an object of this invention to provide one or more thin sections or gates in the elastic sealing member, adjacent to the point of attachment to the socket housing that will provide an effective seal against intrusion of above noted contaminants when lubricant is not being added, that will also flex and thereby open when the elastic sealing member is exposed to internal pressure, as when adding fresh lubricant, thereby allowing the excess contaminated lubricant to escape from the socket and elastic sealing member.

The subject elastomeric sealing member or boot has a flange with one or more thinned sections or gates adjacent to passages in the boot near the point of attachment to a socket housing along with notches in the annular boot flange that together provide an effective seal against intrusion of the above noted contaminants when lubricant is not being added with external applied pressure.

BRIEF DESCRIPTION OF THE SEVERAL VIEWS OF THE DRAWINGS

In the accompanying drawings, in which one of various possible embodiments of the invention is illustrated, corresponding reference characters refer to corresponding parts throughout the several views of the drawings in which.

DETAILED DESCRIPTION OF AT LEAST ONE PREFERRED EMBODIMENT OF THE INVENTION

Figure 1:
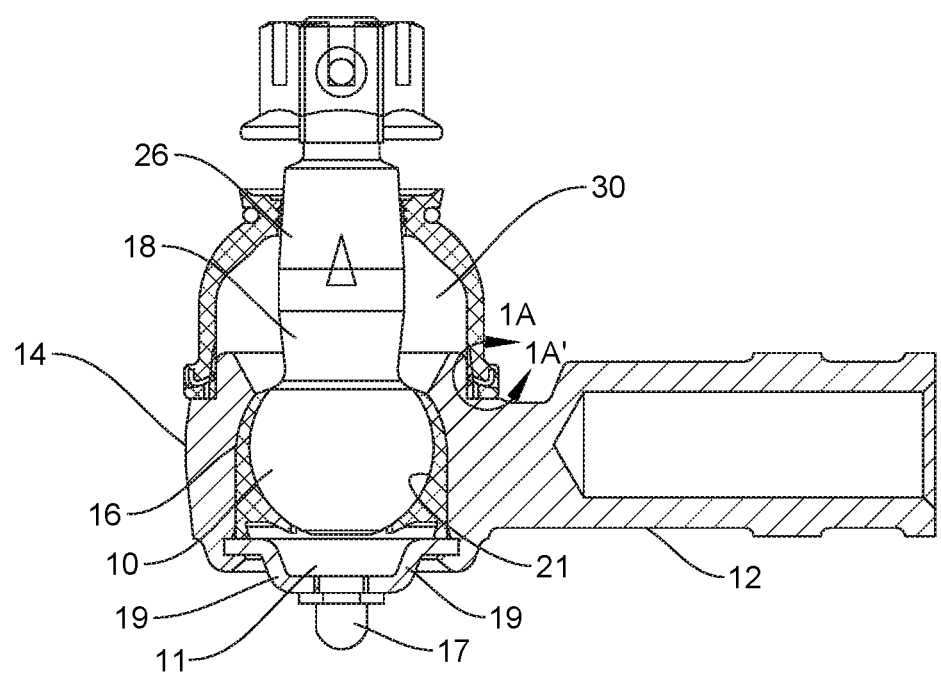
FIG. 1 is a sectional view showing a boot or elastic sealing member with an annular flange at a lower end in accordance with the present invention installed over a pivotal ball socket assembly disposed on an end of a tie rod.
Figure 1A:
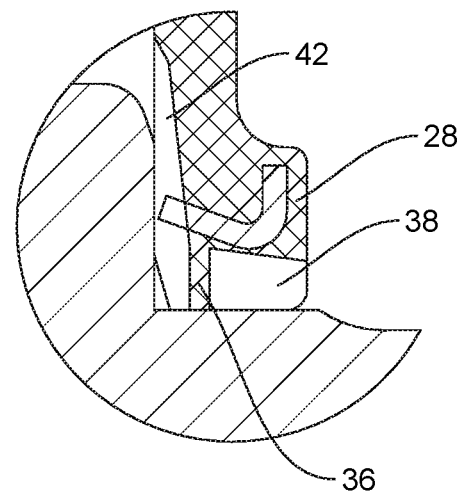
FIG. 1A is an enlarged detail taken from FIG. 1 showing a passageway for lubricant through a thinned section of the boot and annular flange.
Figure 2:
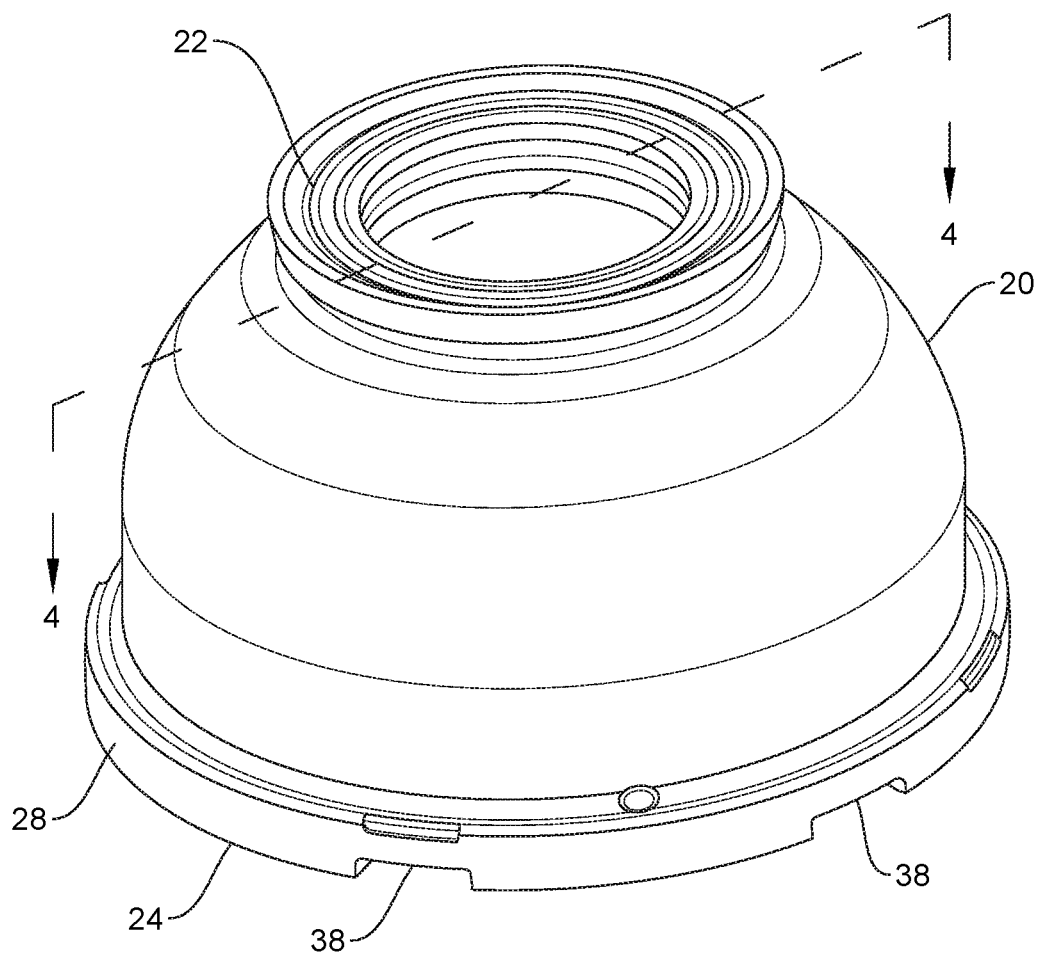
FIG. 2 is a perspective view of the boot or elastomeric sealing member viewed from the outside.
Figure 3:
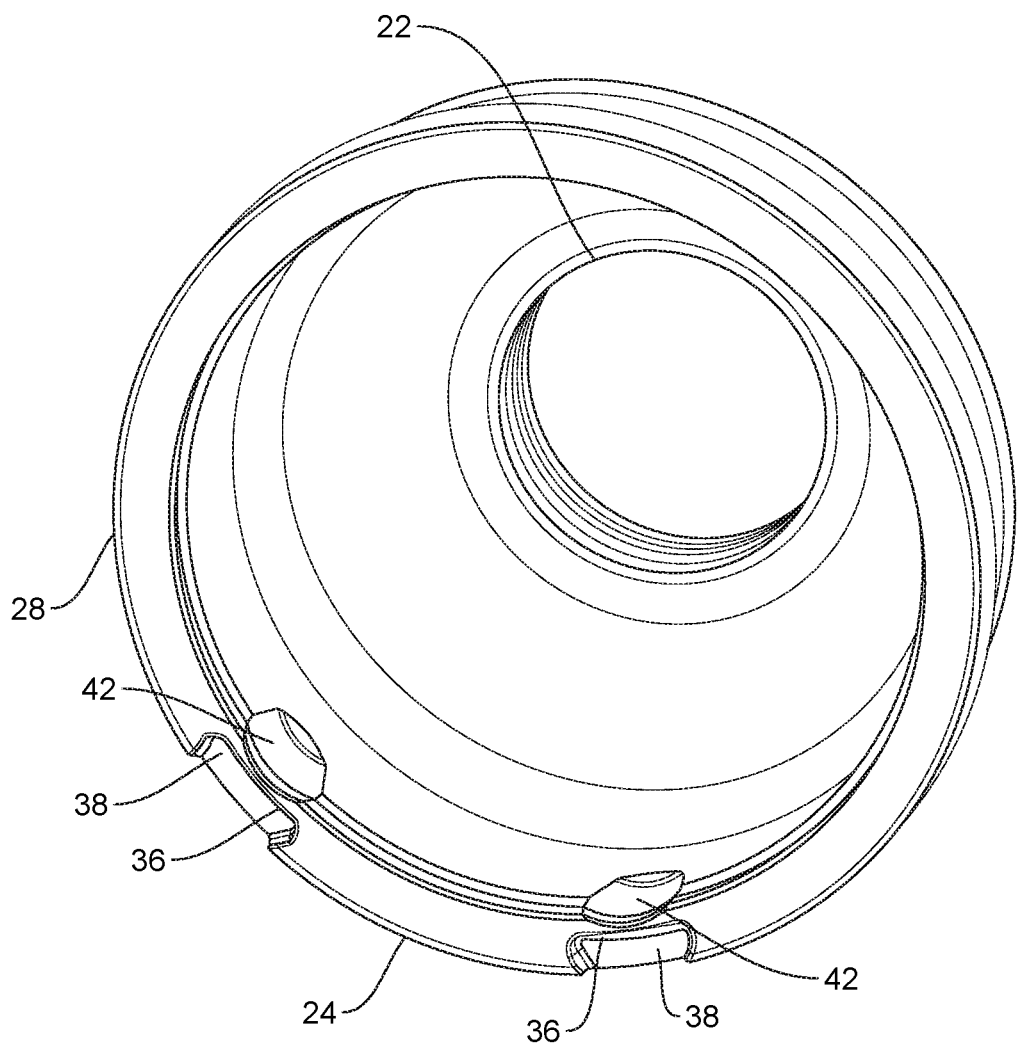
FIG. 3 is a perspective view of the boot or elastomeric sealing member viewed from the inside.

Referring first to FIG. 1, there is shown a pivoting and rotating ball socket assembly 10 disposed within a tie rod end 12. The pivoting and rotating ball socket assembly 10 comprises a housing 14 conventionally integrally formed with tie rod end 12 and having a pair of initially open opposite ends, one or more bearing members or surfaces enclosed in the socket housing, and a ball stud 18 supported on the bearing member(s) or surfaces 16 enclosed in the socket housing 14, and a ball stud bearing surface 21 which may be spherical, partially spherical or partially conical supported on the bearing member(s) or surfaces 16. While illustrated in FIG. 1 on a tie rod, the invention is not limited to tie rods, and is applicable to any such socket which must be isolated from the elements by a flexible sealing boot and which requires the ability to purge contaminated materials from time to time without sacrificing the ability to seal.

Figure 4:
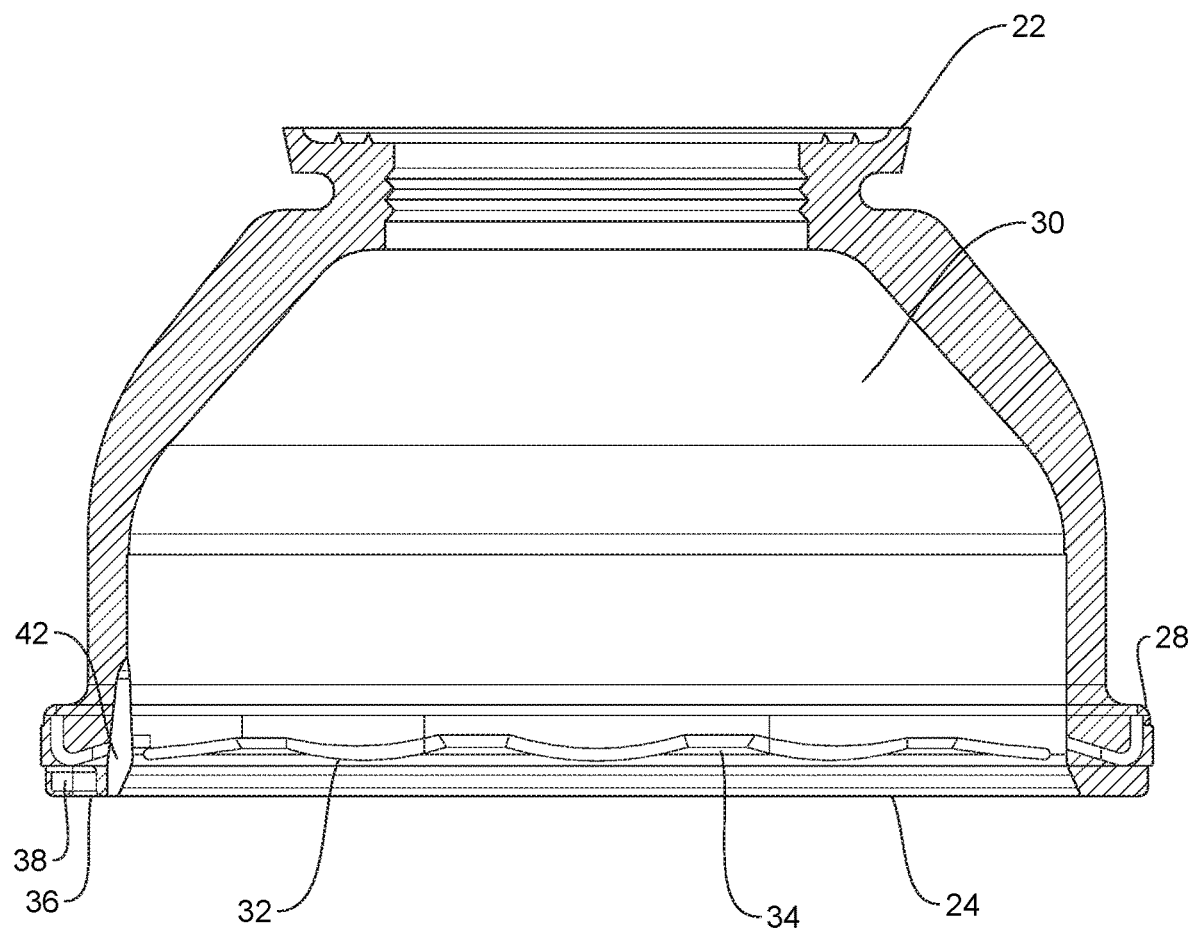
FIG. 4 is a sectional view taken along the plane of 4-4 in FIG. 2.
Figure 5:
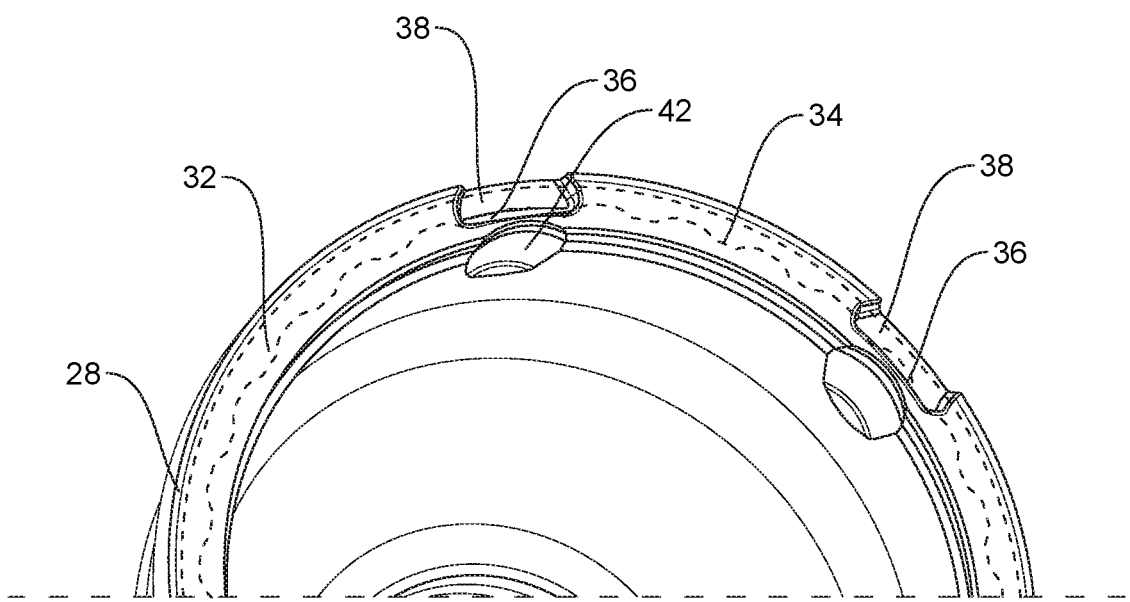
FIG. 5 is a partial perspective view of the boot or elastomeric sealing member viewed from the inside showing a ring with inwardly directed teeth embedded in the boot annular flange.

Turning to FIGS. 2-5 a boot or elastomeric sealing member 20 comprises an enclosure formed of an elastomeric material with an upper end 22 which is considerably smaller in diameter than a lower end opening 24. While the enclosure as shown in the drawings is generally cup shaped, it will be understood to have other configurations. Upper end 22 is configured to fit tightly enough to seal, but loose enough around the ball stud shaft portion 26 to allow sliding motion between ball stud shaft and boot upper end 22. Boot lower end 24 terminates with an annular flange 28 which is configured for seated engagement with socket housing 14. Boot 20 encloses and seals ball stud 18 in the socket housing 14 from the external environment, including dust, dirt and moisture, and also provides a chamber 30 for a lubricant which is injected through a lubricant fitting 17 in the socket housing 14 or retaining plate 19. A ring 32 with inwardly directed serrations or teeth 34 as shown in FIGS. 4 and 5 is embedded in flange 28 at the lower end of boot for engagement with socket housing 14 when the boot is slipped over the stud and seated on the socket housing. The ring is preferably constructed of elastic, or spring steel. The ring serrations or teeth 34 flex during installation and resist a tendency for boot to slide off the housing, once installed. Teeth 34 are preferably truncated and have sharp top and bottom edges that punch through the elastomeric internal section of the boot annular flange upon installation for effective gripping of housing 14.

In use periodically it is desirable to replace the lubricant in socket cavity 11 and boot chamber 30, thereby flushing old lubricant, debris associated with wear of the socket components or other contaminants from the socket and replacing it with new lubricant to reduce friction and increase the service life of the assembly. For this purpose, one or more thinned sections or gates 36 are provided in boot annular flange 28. As shown in FIGS. 2-5 one or more notches 38 are formed in the periphery of annular flange 28 terminated with an inner web of reduced wall thickness in said flange forming gate 36 that is bowed outwardly when exposed to internal pressure.

A cavity 42 which may be formed as an arched tunnel section is provided in a lower end of boot 20, opening to gate 36 providing in conjunction with notches 38, a temporary flow path for lubricant between boot 20 and socket housing 14. When additional lubricant is injected through the lubricant fitting 17 into a lubricant-filled boot 20, pressure of the lubricant lifts the bottom of the thinned wall gate 36, breaking the seal between boot 20 and socket housing 14 thereby forming a flow path for the old lubricant away from the socket, carrying any contaminants with it. Boot 20 may be formed from various elastomeric materials, most commonly neoprene or polyurethane. The thickness of the web forming thinned sections or gates 36 may vary depending on the size of the boot. In many cases the web will not be less than 0.020" and not more than 0.050" with 0.030" to 0.040" being a typical thickness.

Ring 32 embedded in the annular flange 28 as shown in FIGS. 4 and 5 holds the boot firmly in place and presses annular flange 28 against housing 14 to maintain a seal in all areas except for the intended temporary lubricant flow path, when increased boot internal pressure opens gate 36. Embedded ring 32 also insures that boot 20 will not slide off socket housing 14 under applied lubricant pressure or during use. When pressure is sufficiently reduced by release of lubricant, thinned elastomeric gate 36 in the one or more notches 38 is resiliently returned to original sealed position.

In view of the above, it will be seen that various changes could be made in the above constructions without departing from the scope of the invention, it is intended that all matter contained in the above description or shown in the accompanying drawings shall be interpreted as illustrative and not in a limiting sense.

What is claimed:

1. An elastomeric sealing member for a ball socket assembly having a housing and a ball stud shaft, said elastomeric sealing member formed of an elastomeric material with an upper end configured to seal around, but permit movement of the ball stud shaft in the ball socket assembly and a lower end with an annular flange configured for sealing engagement with the housing, said flange having an embedded ring with inwardly directed teeth, said flange having one or more thinned sections forming a gate, a cavity in the lower end of the boot opening to each thinned section and forming a passageway for lubricant to escape when internal pressure is applied.

2. The elastomeric sealing member of claim 1 wherein each of said thinned sections is aligned with spaces between the teeth of the embedded ring.

3. A boot for a ball socket assembly having a housing and a ball stud shaft, said boot formed of an elastomeric material with an upper end configured to seal around but permit movement of the ball stud shaft in the ball socket assembly and a lower end with an annular flange configured for sealing engagement with the housing, said flange having an embedded elastic steel ring with inwardly directed serrations, said annular flange having one or more notches in the periphery of the flange, each of said notches terminating at a closed end with a web forming a gate, a cavity in the lower end of the boot opening to the web forming a passageway for lubricant to escape when internal pressure is applied.

4. The boot of claim 3 wherein serrations in the embedded ring flank each cavity.

5. The boot of claim 4 wherein the serrations are truncated and have sharp top and bottom edges.

6. The boot of claim 5 wherein the serrations punch through the annular flange when the boot is installed on the housing.

7. A boot for a ball socket assembly having a housing and a ball stud shaft, said boot formed of an elastomeric material with an upper end configured to seal around but permit movement of the ball stud shaft in the ball socket assembly and a lower end with an annular flange configured for sealing engagement with the housing, said flange having an embedded elastic steel ring with inwardly directed regularly spaced uniform serrations, said flange having one or more notches in the periphery of the flange, each of said notches terminating at a closed end with a web forming a gate, an arched tunnel cavity in the lower end of the boot aligned with each notch and opening to the web forming a passageway for lubricant to escape when internal pressure is applied, said metal ring aligned with the notches such that adjacent serrations flank each the cavity.

8. The boot of claim 7 wherein the elastic steel ring is formed of spring steel and the serrations are truncated with sharp top and bottom edges.

9. An automotive pivoting and/or rotating socket for chassis applications having an elastomeric sealing member with a first end attached to an exterior housing member of the pivoting and/or rotating socket, said socket containing a stud with spherical, partially spherical, or partially conical enlarged first end and a second end exiting the socket housing and protruding through a second end of the sealing member for attachment to a cooperating suspension member, said sealing member allowing for relative pivoting and/or rotating motion of the first end of the stud to occur between a cooperating member fixedly attached to the housing member, said second end of the stud sealed by the elastomeric sealing member to form a chamber for lubricant, said elastomeric sealing member formed of an elastomeric material with an annular flange configured for sealing engagement with the housing, said flange having one or more thinned sections forming a gate, a cavity in the lower end of the elastomeric sealing member opening to each thinned section and together forming a temporary passageway for lubricant to flow when internal pressure is applied.

10. The automotive pivoting and/or rotating socket of claim 9 wherein the flange of the elastomeric sealing member has an embedded ring with inwardly directed teeth.

11. The automotive pivoting and/or rotating socket of claim 10 wherein each of said thinned sections of the flange is aligned with spaces between the teeth of the embedded ring.

12. The automotive pivoting and/or rotating socket of claim 11 wherein the embedded ring is formed of spring steel and the inwardly directed teeth are truncated and have sharp top and bottom edges, said embedded ring positioned in the flange such that the inwardly directed teeth punch through the annular flange when the flange is in sealing engagement with the housing.

* * * * *